United States Patent Office 3,838,170
Patented Sept. 24, 1974

3,838,170
ISOCHROMANONES
William J. Houlihan, Mountain Lakes, and Jeffrey Nadelson, Lake Parsippany, N.J., assignors to Sandoz-Wander, Inc., Hanover, N.J.
No Drawing. Continuation-in-part of abandoned application Ser. No. 76,294, Sept. 28, 1970. This application Sept. 1, 1972, Ser. No. 285,748
Int. Cl. C07d 7/26
U.S. Cl. 260—343.2 R        2 Claims

ABSTRACT OF THE DISCLOSURE

Spiro phthalan-3-ones and spiro isochroman-1-ones, e.g. 2'-dimethylaminomethyl-3',4'-dihydrospiro[isochroman-3,1'(2'H)-naphthalene]-1-one, are prepared by cyclizing corresponding N-alkyl benzamides and N-alkyl toluamides. The compounds are useful as diuretic, anti-hypertensive and analgesic agents.

---

This application is a continuation-in-part of copending U.S. patent application, Ser. No. 76,294, filed Sept. 28, 1970, now abandoned.

This invention relates to spirophthalanones and isochromanones. More particularly, it relates to spirophthalan-3-ones and spiroisochroman-1-ones having a naphthalene or benzocycloheptene moiety. The invention also relates to intermediates for said compounds, to acid addition salts thereof, and to processes for their preparation.

The compounds of this invention may be represented by the following structural formula:

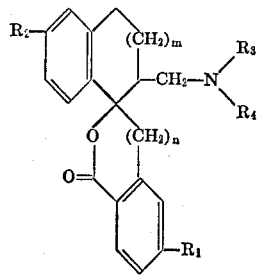

(I)

wherein $R_1$ and $R_2$, independently, represents hydrogen, halo having an atomic weight of 19 to 36, trifluoromethyl, straight chain lower alkoxy, i.e., straight chain alkoxy having 1 to 4 carbon atoms, e.g., methoxy, ethoxy, or butoxy, or straight chain loweralkyl, i.e., straight chain alkyl having 1 to 4 carbon atoms, e.g. methyl, ethyl or propyl; or $R_3$ and $R_4$, independently, represent straight or branched lower-alkyl, i.e. straight or branched alkyl having 1–4 carbon atoms, e.g. methyl, isopropyl, and the like, or loweralkenyl, i.e. alkenyl having 2 to 4 carbon atoms such as allyl, methallyl and the like, or $R_3$ and $R_4$, together, represent —$(CH_2)_x$— where $x$ is 4, 5, 6 or 7; or $R_3$ and $R_4$, together, represent

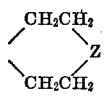

where Z represents O, S, or N—$R_6$, and $R_5$ represents straight or branched chain loweralkyl, as earlier defined, $n$ represents 0 or 1, and
$m$ represents 1 or 2.

The process for preparing the compounds of formula (I) may be represented by the following reaction scheme.

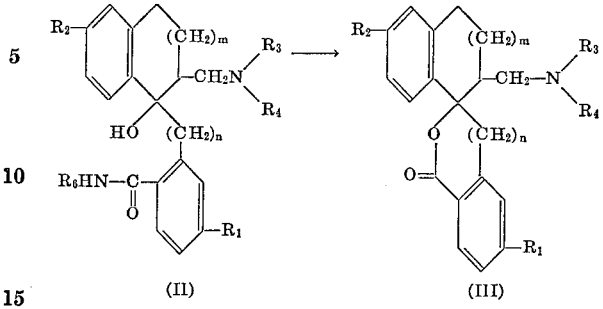

wherein $R_1$, $R_2$, $R_3$, $R_4$, $n$ and $m$ are as indicated above, and
$R_6$ represents straight or branched loweralkyl, as previously defined.

The compounds of formula (I) are prepared by heating a compound of formula (II) optionally in inert solvent such as ethers, e.g. ethyl ether or tetrahydrofuran, hydrocarbons or halogenated hydrocarbons such as hexane, heptane, benzene, toluene, o-dichlorobenzene and the like, at about 100°–220° C. preferably about 140–160° C. for about 15 to 48 hours, preferably about 20 to 28 hours. The temperatures and times used are not critical. To improve yields and obtain a better quality product, the reaction may be performed under inert atmosphere, e.g. nitrogen gas. The compounds of formula (I) may be recovered using conventional recovery techniques such as crystallization.

The compounds of formula (II) may be prepared as indicated by the following reaction scheme:

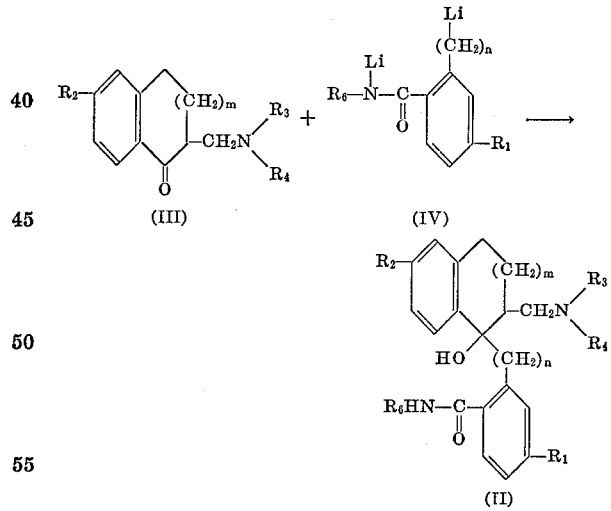

where $R_1$, $R_2$, $R_3$, $R_4$, $R_6$, $n$ and $m$ are as indicated above.

The compounds of formula (II) are prepared by condensing a compound of formula (III) with a compound of formula (IV) in the presence of inert atmosphere, e.g. nitrogen gas, in an inert solvent such as diethyl ether, tetrahydrofuran, hexane, heptane, benzene and the like or mixtures thereof, and subjecting the reaction mixture to hydrolysis, preferably with aqueous ammonium chloride. The condensation may be carried out at a temperature of from about −80 to −20° C., preferably −60 to −40° C. for about 1 to 3 hours. The hydrolysis is performed in a conventional manner at a temperature of about −20 to 0° C. Neither temperatures, solvents nor hydrolyzing agent are critical. Compound (III) is preferably added in inert solvent to a cold (−60° to −40° C.) inert solvent solution of compound (IV). Conventional techniques may be used to recover the product (II).

Certain of the compounds of formulas (III) and (IV) are known and may be prepared by methods disclosed in the literature. Those compounds (III) and (IV) not specifically disclosed may be prepared by analogous methods from known materials.

It will be understood that certain of the compounds of formulas (I) and (II) exist in racemic form or in the form of optically active isomers. Additionally, certain of the compounds of formula (I), may also exist as diastereomeric isomers. The separation and recovery of the respective isomers may be accomplished employing conventional techniques and such isomers are included within the scope of this invention.

The compounds of formula (I) are useful because they possess pharmacological activity in animals. In particular, the compounds can be used as diuretic agents as indicated by their activity in the unanesthetized rat when tested basically as described by R. Aston, Toxicol. and Appl. Pharmacol., 1, 277 (1959).

Additionally, the compounds (I) are useful as antihypertensive agents as indicated by their activity in hypertensive rat tested using a method basically as described by A. Grollman (Proc. Soc. Exptl. Biol. and Med., 57:103; 1944).

The compounds of formula (I) are also useful as analgesics as indicated by their activity in the rat given 25–100 mg./kg. of animal body weight of active material. The test method used is basically described by L. O. Randall and J. J. Selitto (Arch. Int. Pharmacodyn., 111: 409, 1957) as modified by C. A. Winter and L. Flataher (J. P. E. T., 148: 373, 1965).

The compounds of formula (I) are also tested for analgesic activity by utilizing the "Writhing Method" of Seigmund et al. (Proc. Soc. Exp. Biol., 95: 729, 1957) as modified by Okun et al. (J. Pharmacol. & Exper. Therap., 139: 107, 1963). The test drug is administered orally, usually suspended in 1.5% carboxy methocel.

For such use, the compounds may be combined with one or more pharmaceutically acceptable carriers or adjuvants. They may be administered orally or parenterally, and, depending upon the compound employed and the mode of administration, the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid (and vice versa) and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

As noted above, the compounds of formula (I) exist as diastereomeric or optical isomers. In some cases greater pharmacological activity or other beneficial attribute may be found for a particular isomer and in such instances administration of such isomer may be preferred.

In general, satisfactory results are obtained when the compounds are administered for the diuretic or anti-hypertensive uses at a daily dosage of from about 5–100 mg./kg. of animal body weight, preferably given in divided doses, 2 to 4 times a day or in sustained release form. For most larger mammals (e.g. primates) the total daily dosage is from about 350 milligrams to about 1000 milligrams. Dosage forms suitable for internal use comprise from about 80 milligrams to about 500 milligrams of active compound in intimate admixture with a solid or liquid pharmaceutically acceptable carrier or diluent.

Satisfactory results for analgesic activity are obtained when the compounds are administered at a daily dosage of from about 1–100 mg./kg. of animal body weight. This daily dosage is preferably given in divided doses, e.g., 2 to 4 times a day, or in sustained release form. For most large mammals, the total daily dosage is from about 75 to 2000 milligrams, and dosage forms suitable for internal administration comprise from about 19.5 milligrams to about 1000 milligrams of the compound in admixture with a solid or liquid pharmaceutical carrier or diluent.

A representative formulation suitable for oral administration is a capsule prepared by standard techniques which contains the following:

| Ingredients: | Parts by weight |
|---|---|
| 2 - dimethylaminomethyl - 3,4 - dihydrospiro [naphthalene-1(2H),1'-phthalan]-3'-one | 35 |
| Inert filler (starch, kaolin, lactose, etc.) | 275 |

EXAMPLE 1

α-(2-dimethylaminomethyl-1,2,3,4-tetrahydro-1-hydroxy-1-naphthyl)-N-methyl-o-toluamide To a flask equipped with a stirrer, dropping funnel, condenser and gas inlet tube maintained under a nitrogen atmosphere there is added at room temperature 40.0 g. (0.28 mole) of o-methyl-N-methyl benzamide and 250 ml. of anhydrous tetrahydrofuran. The reaction flask is immersed in an ice bath and cooled to an internal temperature of 5° C. Stirring is initiated and 380 ml. of 1.6 M. n-butyllithium (0.616 mole) in hexane is added dropwise in ca. 1 hour maintaining the temperature below 8° C. The resulting red dilithio salt is stirred at 5° C. for 1 additional hour and the reaction flask is then immersed in a Dry-Ice acetone bath and cooled to an internal temperature of —60° C. To the cold reaction mixture a solution of 56.8 g. (0.28 mole) of 2-(dimethylaminomethyl)-3,4-dihydro-1-(2H)-naphthalenone in 140 ml. of anhydrous tetrahydrofuran is added dropwise in ca. 45 min. maintaining the temperature between —60° C. and —50° C. The resulting reaction mixture is stirred at —60° C. for 1 hour, allowed to warm to 0° C. in ca. 1 hour, and then treated with 200 ml. of saturated aqueous ammonium chloride while maintaining the temperature below 10° C. The resulting two layers are separated and the tetrahydrofuran layer is dried over magnesium sulfate, filtered and evaporated. The residue is chromatographed on silica gel with benzene:ethylacetate (1:1) to provide α-(2-dimethylaminomethyl-1,2,3,4-tetrahydro-1-hydroxy-1-naphthyl)-N-methyl-o-toluamide.

When the above process is carried out and in place of o-methyl-N-methyl benzamide there is used (a) 4-methoxy-N-methyl benzamide,
(b) 4-chloro-2-methyl-N-ethylbenzamide,
(c) 2,4-dimethyl-N-methyl benzamide,
(d) 4-trifluoromethyl-N-methyl benzamide, or
(e) N-methyl benzamide, there is obtained (a) 2-(2-dimethylaminomethyl-1,2,3,4-tetrahydro-1-hydroxy-1-naphthyl)-4-methoxyN-methyl benzamide,
(b) 4-chloro-α-(2-dimethylaminomethyl-1,2,3,4,-tetrahydro-1-hydroxy-1-naphthyl)-N-ethyl-o-toluamide,
(c) α-(2-dimethylaminomethyl-1,2,3,4-tetrahydro-1-hydroxy-1-naphthyl)-4-methyl-N-methyl-o-toluamide,
(d) 2-(2-dimethylaminomethyl-1,2,3,4-tetrahydro-1-hydroxy-1-naphthyl)-4-trifluoromethyl-N-methyl benzamide, or
(e) 2-(2-dimethylaminomethyl-1,2,3,4-tetrahydro-1-hydroxy-1-naphthyl)-N-methyl benzaminde, respectively.

When the above procedure is carried out and in place of 2-(dimethyl - aminomethyl)-3,4-dihydro-1-(2H)naphthalenone there is used (f) 6-chloro-3,4-dihydro-2-(N-methylpiperazinomethyl)-1-(2H)naphthalenone,
(g) 6,7,8,9-tetrahydro-2-methyl-6-morpholinomethyl-5(5H)-benzocycloheptenone,
(h) 6,7,8,9-tetrahydrahydro-2-methoxy-6-pyrrolidylmethyl-5(5H)-benzocycloheptenone,
(i) 3,4-dihydro-2-thiomorpholinomethyl-6-trifluoromethyl-1-(2H)naphthalenone,
(j) 3,4-dihydro-2-piperidinylmethyl-1-(2H)napthalenone, or (k) 6-diallylaminomethyl-6,7,8,9-tetrahydro-5(5H)-benzocycloheptenone, there is obtained (f) α(6-chloro-1,2,3,4-tetrahydro-1-hydroxy-2-N-methylpiperazinomethyl-1-naphthyl)-N-methyl-o-toluamide,
(g) α-(6,7,8,9-tetrahydro-5-hydroxy-2-methyl-6-morpholinomethyl-5(5H)-benzocycloheptenyl)-N-methyl-o-toluamide,
(h) α-(6,7,8,9-tetrahydro-5-hydroxy-2-methoxy-6-pyrrolidylmethyl-5(5H)-benzocycloheptenyl)-N-methyl-o-toluamide,
(i) α-(1,2,3,4-tetrahydro-1-hydroxy-2-thiomorpholinomethyl-6-trifluoromethyl-1-naphthyl)-N-methyl-o-toluamide,
(j) α-(1,2,3,4-tetrahydro-1-hydroxy-2-piperidinylmethyl-1-naphthyl)-N-methyl-o-toluamide, or
(k) α-(6-diallylaminomethyl-6,7,8,9-tetrahydro-5-hydroxy-5(5H)-benzocycloheptenyl)-N-methyl-o-toluamide, respectively.

EXAMPLE 2

2'-dimethylaminomethyl-3',4'-dihydrospiro[isochroman-3,1'-(2'H)-naphthalene]-1-one To a flask equipped with a stirrer, condenser and gas inlet tube maintained under a nitrogen atmosphere there is added at room temperature 17.6 g. (0.05 mole) of α-(2 - dimethylaminomethyl-1,2,3,4-tetrahydro-1-hydroxy-1-naphthyl)-N-methyl-o-toluamide and 170 ml. of o-dichloro benzene. Stirring is initiated and the mixture is heated at reflux for 18 hours. The excess o-dichlorobenzene is then removed by distillation in vacuo and the resulting oil is crystallized from hot ethyl acetate to give 2'-dimethylaminomethyl - 3',4'-dihydrospiro[isochroman-3,1'-(2'H)-naphthalene]-1-one; m.p. 159°–163° C.

When the above process is carried out and in place of α - (2-dimethylaminomethyl-1,2,3,4-tetrahydro-1-hydroxy-1-naphthyl)-N-methyl-o-toluamide there is used (a) 2-(2-dimethylaminomethyl-1,2,3,4-tetrahydro-1-hydroxy-1-naphthyl)-4-methoxy-N-methyl benzamide,
(b) 4-chloro-α-(2-dimethylaminomethyl-1,2,3,4-tetrahydro-1-hydroxy-1-naphthyl)-N-ethyl-o-toluamide,
(c) α-(2-dimethylaminomethyl-1,2,3,4-tetrahydro-1-hydroxy-1-naphthyl)-4-methyl-N-methyl-o-toluamide,
(d) 2-(2-dimethylaminomethyl-1,2,3,4-tetrahydro-1-hydroxy-1-naphthyl)-4-trifluoromethyl-N-methyl benzamide,
(e) 2-(2-dimethylaminomethyl-1,2,3,4-tetrahydro-1-hydroxy-1-naphthyl)-N-methyl benzamide,
(f) α-(6-chloro-1,2,3,4-tetrahydro-1-hydroxy-2-N-methylpiperazinomethyl-1-naphthyl)-N-methyl-o-toluamide,
(g) α-(6,7,8,9-tetrahydro-5-hydroxy-2-methyl-6-morpholinomethyl-5(5H)-benzocycloheptenyl)-N-methyl-o-toluamide,
(h) α-(6,7,8,9-tetrahydro-5-hydroxy-2-methoxy-6-pyrrolidylmethyl-5(5H)benzocycloheptenyl)-N-methyl-o-toluamide,
(i) α-(1,2,3,4-tetrahydro-1-hydroxy-2-thiomorpholinomethyl-6-trifluoromethyl-1-naphthyl)-N-methyl-o-toluamide,
(j) α-(1,2,3,4-tetrahydro-1-hydroxy-2-piperidinylmethyl-1-naphthyl)-N-methyl-o-toluamide, or
(k) α-(6-diallylaminomethyl-6,7,8,9-tetrahydro-5-hydroxy-5(5H)benzocycloheptenyl)-N-methyl-o-toluamide, there is obtained (a) 2-dimethylaminomethyl-3,4-dihydro-5'-methoxyspiro[naphthalene-1(2H),1'-phthalan]-3'-one,
(b) 5-chloro-2'-dimethylaminomethyl-3',4'-dihydrospiro[isochroman-3,1'(2'H)-naphthalen]-1-one,
(c) 2'-dimethylaminomethyl-3',4'-dihydro-5-methylspiro[isochroman-3,1'(2'H)-naphthalen]-1-one,
(d) 2-dimethylaminomethyl-3,4-dihydro-5'-trifluoromethylspiro[naphthalene-1-(2H)-1'-phthalan]-3'-one,
(e) 2-dimethylaminomethyl-3,4-dihydrospiro[naphthalene-1(2H),1'-phthalan]-3'-one,
(f) 6'-chloro-3',4'-dihydro-2'-N-methylpiperazinomethylspiro[isochroman-3,1'(2'H)-naphthalen]-1-one,
(g) 6,7,8,9-tetrahydro-2-methyl-6-morpholinomethylspiro[benzocycloheptene-5,3'-isochroman]-1'-one,
(h) 6,7,8,9-tetrahydro-2-methoxy-6-pyrrolidylmethylspiro[benzocycloheptene-5,3'-isochroman]-1'-one,
(i) 3',4'-dihydro-2'-thiomorpholinomethyl-6'-trifluoromethylspiro[isochroman-3,1'(2'H)-naphthalen]-1-one,
(j) 3',4'-dihydro-2'-piperidinylmethylspiro[isochroman-3,1'(2'H)-naphthalen]-1-one, or
(k) 6-diallylaminomethyl-6,7,8,9-tetrahydrospiro[benzocycloheptene-5,3'-isochroman]-1'-one, respectively.

What is claimed is:
1. A compound of the formula

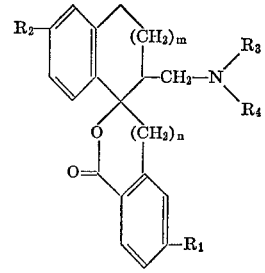

wherein
each of $R_1$ and $R_2$, independently, represents hydrogen, halo having an atomic weight of 19 to 36, trifluoromethyl, straight chain lower alkoxy or straight chain lower alkyl;
$R_3$ and $R_4$, independently, represent straight or branched loweralkyl or loweralkenyl;
$n$ represents 1; and
$m$ represents 1 or 2;
or a pharmaceutically acceptable acid addition salt thereof.
2. The compound of claim 1 which is 2'-dimethylaminomethyl - 3',4'-dihydrospiro[isochroman-3,1'-(2'H)-naphthalene]-1-one.

References Cited
UNITED STATES PATENTS
3,772,339  11/1973  Greenwald  260—343.2

JOHN M. FORD, Primary Examiner

U.S. Cl. X.R.
260—343.3, 243 B, 268 PC, 247.2 B; 424—279